United States Patent [19]

Kraemer

[11] 4,247,231

[45] Jan. 27, 1981

[54] TOOL HOLDER

[75] Inventor: Rolf H. Kraemer, Gurnee, Ill.

[73] Assignee: Fansteel Inc., North Chicago, Ill.

[21] Appl. No.: 1,705

[22] Filed: Jan. 8, 1979

[51] Int. Cl.³ .............................................. B26D 1/00
[52] U.S. Cl. .................................. 407/101; 407/107; 407/117; 82/36 R
[58] Field of Search ................. 407/117, 101, 107, 66; 82/36 R

[56] References Cited

U.S. PATENT DOCUMENTS

| 2,838,827 | 6/1958 | Wright | 407/107 |
| 3,376,763 | 4/1968 | Welles | 407/101 |
| 3,577,618 | 5/1971 | Cashman | 407/101 |
| 3,596,338 | 8/1971 | Meehan et al. | 407/117 |
| 3,688,366 | 9/1972 | Jones | 407/117 |
| 3,802,042 | 4/1974 | Novkov | 407/117 |
| 3,815,454 | 6/1974 | Knott | 407/117 |

Primary Examiner—Leonidas Vlachos
Attorney, Agent, or Firm—Barnes, Kisselle, Raisch & Choate

[57] ABSTRACT

A tool holder for grooving and parting machining operations and the like having a cutting insert received on a support plate carried by a tool body. Recesses in the bottom and rear edges of the support plate bear on support pins pressed into the body and the support plate is retained in engagement with the pins and a side face of the body by a screw extending through a hole in the plate and threaded into the body. A clamp carried by the body bears on the cutting insert to retain the insert in a seat on the plate.

11 Claims, 4 Drawing Figures

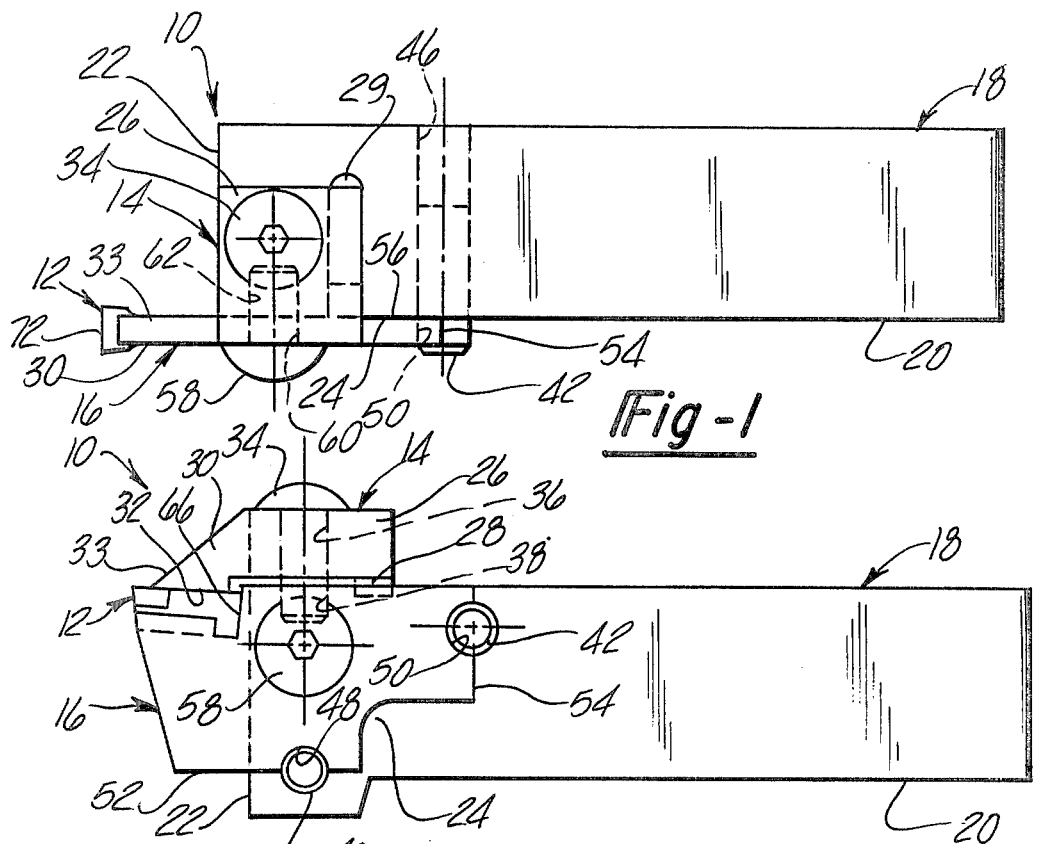
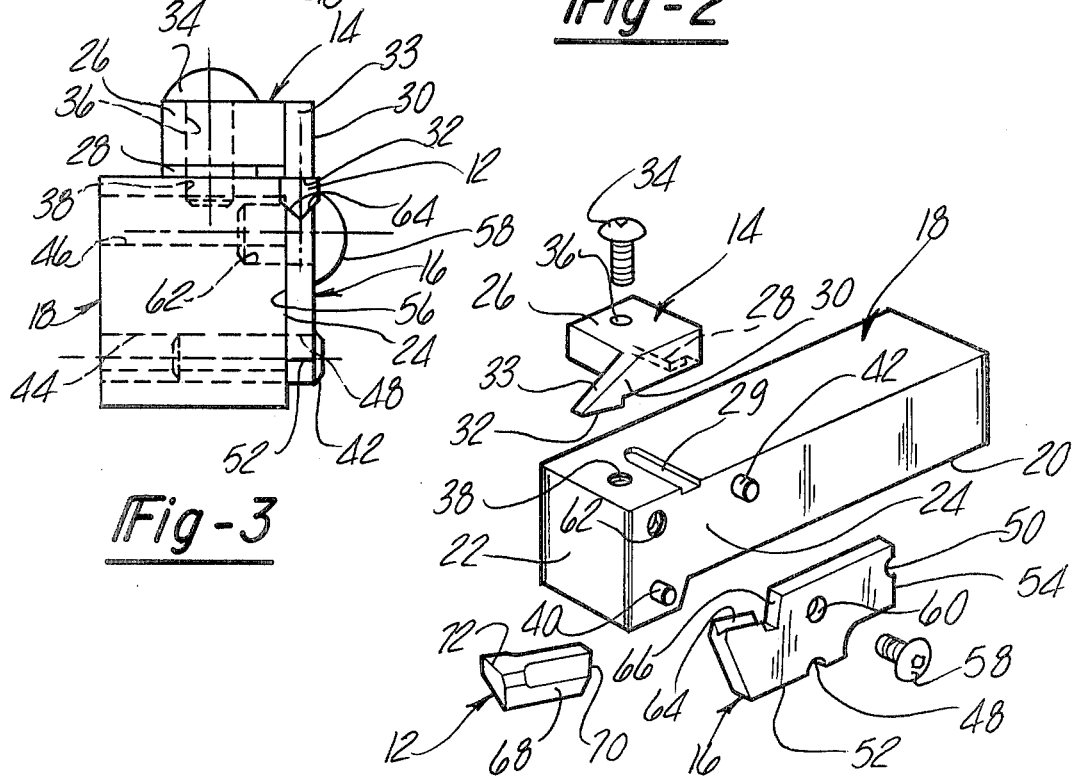

TOOL HOLDER

This invention relates to a tool holder and more particularly to an improved tool holder for machining operations such as turning, tracing, grooving, parting or cutting off and the like.

In grooving and cutoff tools with changeable cutting inserts the cutting inserts must be securely held and rigidly supported on a blade or support plate which is narrower than the width of the cutting insert and projects substantially from the body of the tool holder in order to accommodate deep cuts. To provide adequate support the plate is usually received on a shelf or a key in a recess or pocket in the tool holder. Such constructions are complicated to manufacture since they require complex configurations which must be machined and ground to very close tolerances and often can be utilized with support plates of only one specific width or thickness.

Objects, features and advantages of this invention are to provide a tool holder for cutting inserts in which support plates of varying thicknesses and lengths of forward projection may be utilized with the same body which, may be readily adapted to rigidly support a variety of cutting insert configurations, and which is of simplified and economical design, manufacture and assembly.

These and other objects, features and advantages of this invention will be apparent from the following detailed description, appended claims, and accompanying drawing in which:

FIGS. 1, 2 and 3 are plan, side and end views respectively of a tool holder embodying this invention; and FIG. 4 is an exploded perspective view of the tool holder of FIG. 1.

Referring in more detail to the drawing, FIGS. 1 through 4 illustrate a tool holder 10 embodying this invention with a changeable cutting insert 12 retained by a clamp assembly 14 on a support plate 16 carried by a generally rectangular holder body 18 with a rectangular shank 20 and a head 22 with a flat side plate mounting abutment face 24. Clamp assembly 14 has a body 26 with an integral key or rib 28 slidably received in a groove 29 in body 18 and a forwardly projecting finger 30 with a face 32 bearing on insert 12 and an inclined chip breaker face 33. Clamp body 26 is retained on holder body 18 and urged into engagement with insert 12 by a clamp screw 34 extending through a hole 36 in the clamp body and received in a threaded hole 38 in the holder body.

In accordance with this invention support plate 16 is simply and accurately located and mounted on shank 18 by a pair of load bearing support pins 40 and 42 pressed into accurately located holes 44 and 46 in body 18 and arranged to bear on semi-circular recesses 48 and 50 in the bottom and rear edges 52 and 54 of the support plate. Support plate 16 has a flat side face 56 which bears on the flat face 24 of holder body 18 and the support plate is retained on the body in engagement with both the flat face and the support pins by a retainer screw 58 extending through a hole 60 in the plate and received in a threaded hole 62 in the body. Insert 12 is received in a pocket of support plate 16 formed by a groove and through slot defining generally V-shaped seat faces 64 and a rear abutment face 66 which bear on complimentary side faces 68 arranged in a V configuration and a rear face 70 of insert 12. The forward cutting edge 72 of the insert 12 constitutes the widest portion of the insert which may be formed of tungsten carbide or a similar hard cutting material.

Tool holders embodying this invention are of particularly simplified design and economical manufacture and assembly since they eliminate the need for any recess or pocket in the holder body and utilize a pair of support pins which may be accurately located in the body by simply drilling and reaming two holes therein utilizing a simple jig or fixture. This mounting arrangement may be readily adapted to support plates of varying thickness which may be economically fabricated with relatively simple machining operations and readily adapted to receive a variety of different insert configurations.

I claim:

1. A tool holder for a cutting insert comprising a body having a shank and at least one abutment portion constructed and arranged to bear on a side face of a support plate; a support plate having at least a portion of a side face constructed and arranged to bear on said abutment portion of said body, a portion projecting beyond said body and having a seat constructed and arranged to receive a cutting insert such that the insert is carried solely by said plate with the cutting edge of the insert lying beyond said body, said portion projecting beyond said body having a width which is less than the width of the cutting edge of the cutting insert, and at least first and second recesses therein spaced apart from each other; said body and plate being constructed and arranged so that bottom and rear edges of said plate do not bear on said body; first and second support pins each carried by said body and constructed and arranged to be received in one of said recesses and bear on said support plate through only a portion of the entire periphery of the pin to accurately locate and support said plate on said body and transmit to said body through said pins the rearward and downward thrust produced when the insert is machining a workpiece; and means releasably retaining said support plate on said body in simultaneous engagement with said abutment of said body and said pins.

2. The tool holder of claim 1 wherein said retaining means comprises a screw extending through a hole in said side plate and threaded into said body to urge at least a portion of said side face of said support plate into engagement with said abutment of said body.

3. The tool holder of claim 1 wherein said abutment portion of said body comprises a generally flat portion of a side face of said body.

4. The tool holder of claim 1 which also comprises a clamp carried by said body and constructed and arranged to bear on a cutting insert received on said seat of said support plate to releasably retain the cutting insert on said seat.

5. The tool holder of claim 1 wherein said abutment portion of said body comprises a generally flat face and said body has a groove therein extending generally transversely of said flate face, and the tool holder also comprises a clamp having a rib received in said recess and a finger portion constructed and arranged to bear on an insert received on said seat of said support plate to retain the insert on said seat.

6. The tool holder of claim 1 wherein said body does not have any recess or pocket receiving said support plate.

7. The tool holder of claim 1 wherein said first recess is in a rear edge of said support plate, opens to the exterior thereof and is constructed and arranged to bear on said first pin.

8. The tool holder of claim 7 wherein said second recess is in a bottom edge of said support plate, opens to the exterior thereof, and is constructed and arranged to bear on said second pin.

9. The tool holder of claim 8 wherein said retaining means comprises a screw extending through a hole in said support plate, threaded into said body, and having a head bearing on said support plate to urge at least a portion of said one face of said support plate into engagement with said abutment of said body.

10. The tool holder of claim 8 wherein said body does not have any recess or pocket receiving said support plate.

11. The tool holder of claim 8 wherein said seat of said support plate comprises a groove having a pair of faces constructed and arranged with a generally V-shape cross-section to bear on complimentary faces of the cutting insert received in the seat.

* * * * *